Dec. 11, 1951  A. A. HOLLAND  2,578,355
DEHYDRATION OF MINERAL SALTS BY DRUM DRIER
Filed Nov. 3, 1948  2 SHEETS—SHEET 1
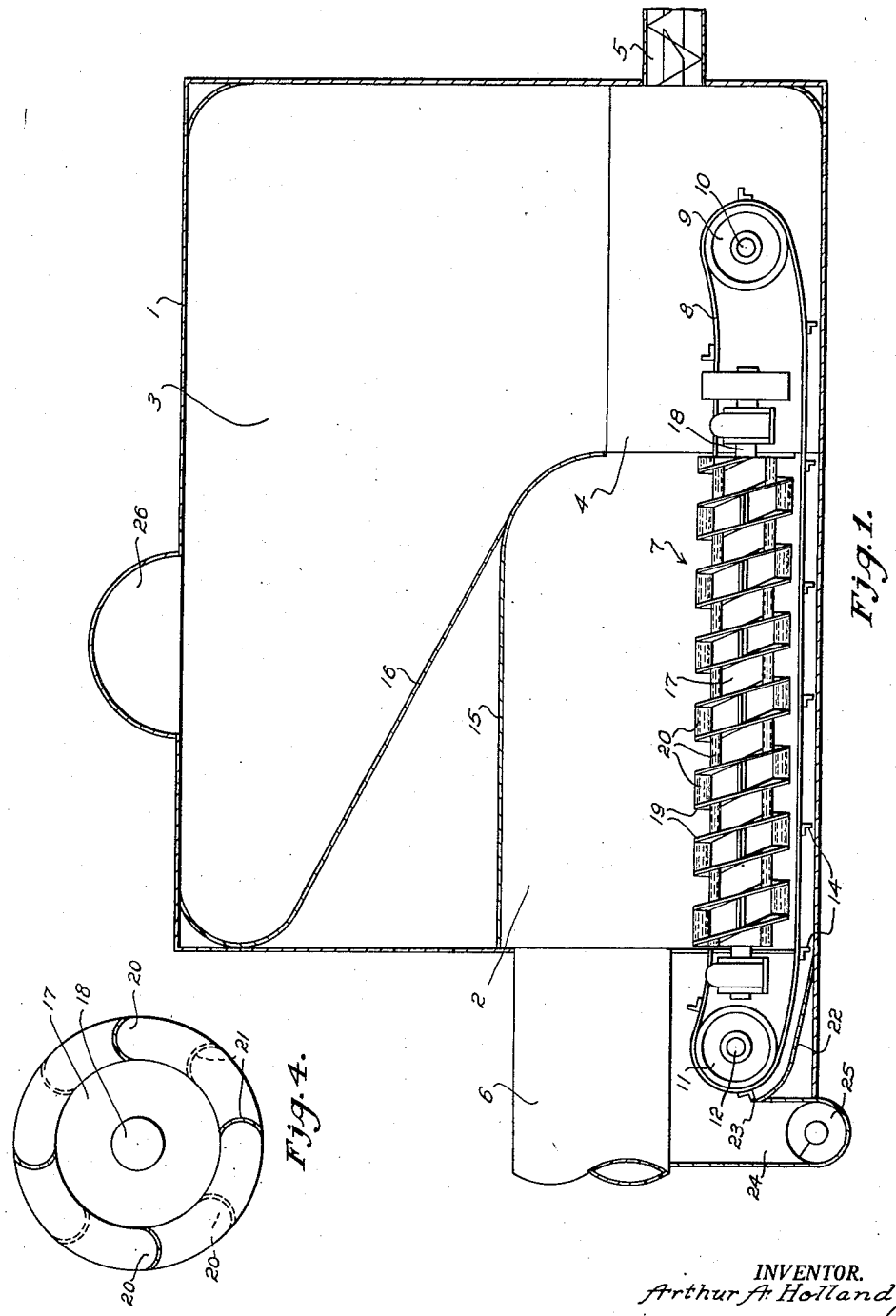
INVENTOR.
Arthur A. Holland
BY
Attorney.

Dec. 11, 1951            A. A. HOLLAND            2,578,355
DEHYDRATION OF MINERAL SALTS BY DRUM DRIER
Filed Nov. 3, 1948            2 SHEETS—SHEET 2

INVENTOR.
Arthur A. Holland
BY
Alex. E. MacRae
Attorney.

UNITED STATES PATENT OFFICE 2,578,355

DEHYDRATION OF MINERAL SALTS BY DRUM DRIER

Arthur A. Holland, Chaplin, Saskatchewan, Canada

Application November 3, 1948, Serial No. 58,097
In Canada October 8, 1948

3 Claims. (Cl. 159—10)

This invention relates to the dehydration of salts in aqueous solution and is particularly directed to the treatment of salts, like sodium sulphate, which melt in their own water of crystallization.

Many methods have been proposed for the extraction of sodium sulphate from its naturally occurring aqueous solutions but there are difficulties in the economical extraction of the salt. Much heat is required and the caking of the salt on the walls and other parts of the drier offers difficulty and adds to the cost of the operation.

The object of the present invention is to provide an improved method and apparatus for dehydrating of such salts. While the invention is particularly described with reference to the extraction of sodium sulphate it will be apparent that it is useful for dehydrating other materials and is to be so interpreted.

It has been found that the encrusting or caking of the salt on the drying equipment as well as the evaporation, and thus the efficiency of the procedure, is largely determined by the particular manner in which the body of salt solution is handled and the particles thereof projected into the drying atmosphere.

Figure 3:
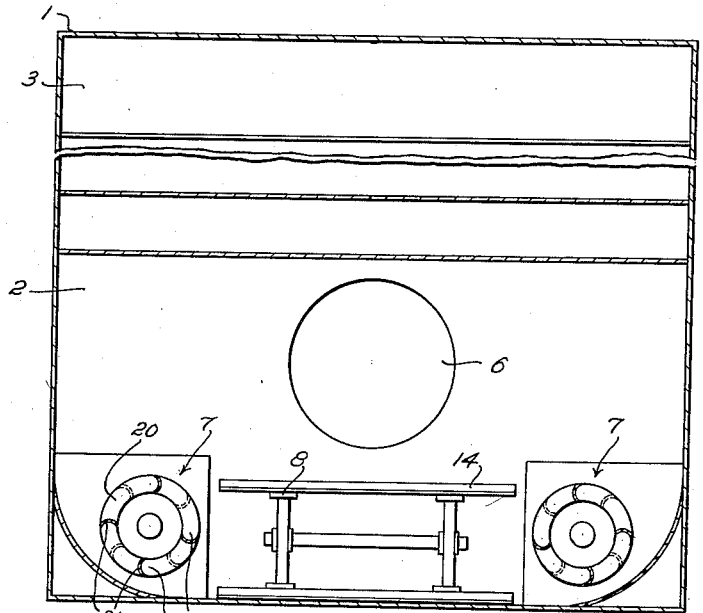
Figure 2:
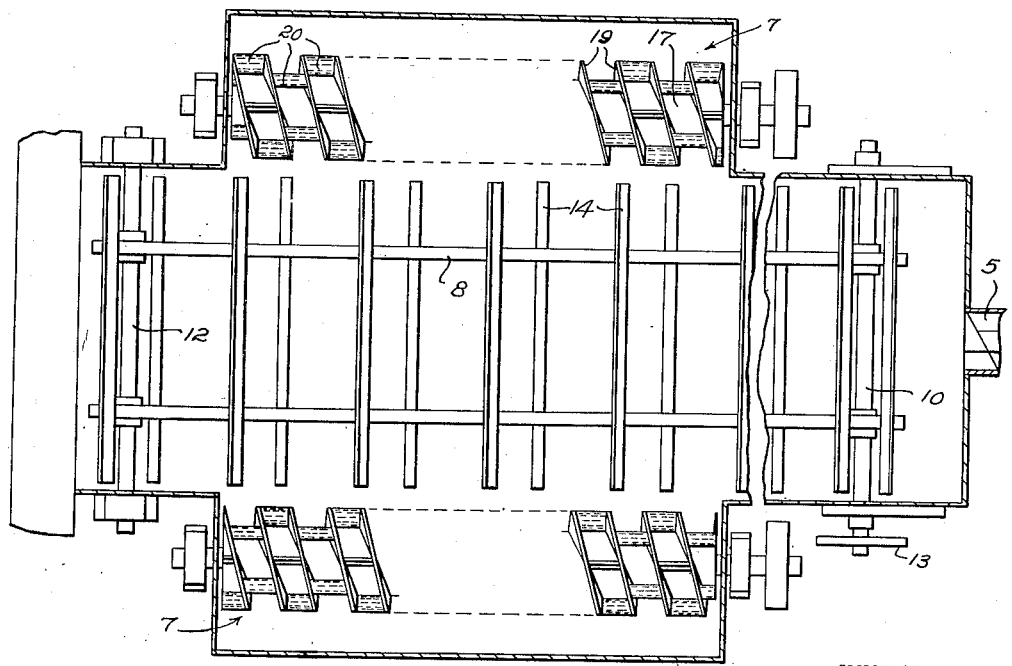

The invention will be described with reference to the accompanying drawings in which Figure 1 is a side elevation in section of the apparatus, Figure 2 is a plan view in section, Figure 3 is an end elevation in section, and Figure 4 is an end elevation of the spray device.

In the drawing, 1 represents a drying chamber having the confined zone 2 and the larger zone 3 in communication through the opening 4. The brine feed inlet is at 5 and the hot gases inlet at 6. A spray device 7 is located longitudinally of zone 2 and preferably at each side thereof as best shown in Figures 2 and 3. Located between and parallel with the spray devices is a scraper conveyor 8 mounted on a sprocket 9 carried by a shaft 10 driven by the pulley 13 and a tail sprocket 11 on the shaft 12. Scrapers 14 are carried by the conveyor. The spray zone 2 is vertically confined by the top wall 15 which is curved downwardly at its forward end to the outlet passage 4 leading to the larger expansion zone 3 in the rear end of which is the drainage baffle 16. The height of the expansion zone is preferably twice that of the spray zone.

The spray device, two of which are used in the form shown in Figures 1, 2 and 3, comprises a drum 17 mounted for rotation on a driven shaft 18. Circumferentially arranged on the drum are spiral blades 19 and between the adjacent blades is formed a series of cup-like compartments 20 by means of the transverse walls 21.

At the outlet end of the drier the conveyor 8 discharges over the upwardly inclined ramp 22 and lip 23 into a collecting chamber 24 in which is a discharging conveyor 25. 26 is the outlet for the expansion chamber 3 through which vapors are exhausted.

In operation the material to be dried is fed into the drying chamber through the inlet conveyor 5 preferably at a rate to provide a liquid level below the surface of the drum 7 on which the spiral blades and cup-like compartments are arranged. The amount of liquid picked up by each cup-like compartment in the spray device and the speed at which the spray device is rotated determines the size of the sprayed liquid particles and the extent to which caking or encrustation of the salt is prevented within the confined spray zone. This cup-like arrangement of the spray device provides a relatively coarse rain-like spray which is much more effective in preventing caking than a fine spray, such as that delivered by a drum revolving in contact with the solution. It has been found that when the linear velocity of solution leaving the cups is at least 8,000 feet per minute encrustation is effectively prevented by use of this spraying device. The actual velocity varies with the size of the confined spray chamber as this affects the distance the sprayed particles have to travel to contact the walls of the chamber. Hot gases passed into the spray chamber pick up the moisture from the sprayed particles and carry it through the expansion zone 3 to the exhaust outlet 26. Because of the reduced rate of travel through the expansion zone mechanically suspended particles of solution are segregated and drain back into the mass under treatment.

As the solution is concentrated the salt crystallizes out and is continuously removed by the scraper conveyor and discharged from the drier, thus avoiding the tendency for it to redissolve in the remaining mass. The drying gas used may be from direct fired burner or the exhaust gases from other source.

This manner of spraying the mass to be dried and of circulating the drying gases is found efficiently to utilize the heat energy in the drying gaseous medium as indicated by the fact that the temperature of the exhaust gases is normally not more than 20° higher than that of the solution being sprayed.

It will be apparent that the spray device may be used in other specific forms of the drying chamber.

What is claimed is:

1. Dehydrating apparatus comprising a drying chamber, a spray device mounted longitudinally of the chamber at each side adjacent the bottom thereof, said spray device comprising a rotatably mounted drum, a spiral blade mounted longitudinally on the drum, and a plurality of transverse walls between adjacent flights of the blade each extending from the periphery thereof to the drum to form cup-like compartments circumferentially disposed between adjacent flights of the blade, and a conveyor extending longitudinally of the chamber and located between the spray devices.

2. Dehydrating apparatus comprising means forming a drying chamber having therein a spray zone and a larger expansion zone in communication with one another, said spray zone having a hot gas inlet, a liquid spraying device in said spray zone comprising a drum rotatably mounted in said spray zone and extending longitudinally therethrough, a spiral blade mounted longitudinally on the drum, and a plurality of transverse walls between adjacent flights of the blade each extending from the periphery thereto to the drum to form cup-like compartments circumferentially disposed between adjacent flights of the blade, said expansion zone having an outlet for drying gases, means for feeding material to be dried to the drying chamber, and a conveyor for discharging dried material extending longitudinally of said spray zone and below said spraying device.

3. Dehydrating apparatus comprising a drying chamber, a spray device mounted longitudinally of the chamber adjacent the bottom thereof, said spray device comprising a rotatably mounted drum, a spiral blade mounted longitudinally on the drum, and a plurality of transverse walls between adjacent flights of the blade each extending from the periphery thereof to the drum to form cup-like compartments circumferentially disposed between adjacent flights of the blade, and a conveyor extending longitudinally of the chamber and located below the spray device.

ARTHUR A. HOLLAND.

REFERENCES CITED

The following references are of record in the file of this patent:

UNITED STATES PATENTS

| Number | Name | Date |
|---|---|---|
| 426,361 | Buttner et al. | Apr. 22, 1890 |
| 501,048 | Bassett | July 11, 1893 |
| 1,091,464 | Wagner | Mar. 24, 1914 |
| 1,190,127 | Disdier | July 4, 1916 |
| 1,720,786 | Fasting | July 16, 1929 |
| 1,730,902 | Rugh | Oct. 8, 1929 |
| 1,992,520 | Colton et al. | Feb. 26, 1935 |
| 2,042,549 | Pranke | June 2, 1936 |
| 2,276,172 | Farr et al. | Mar. 10, 1942 |
| 2,278,953 | Stockham | Apr. 7, 1942 |
| 2,307,995 | Davey | Jan. 12, 1943 |
| 2,312,474 | Peebles | Mar. 2, 1943 |
| 2,384,998 | Haugh | Sept. 18, 1945 |
| 2,397,818 | Tausch | Apr. 2, 1946 |